United States Patent
Park et al.

(10) Patent No.: US 8,849,345 B2
(45) Date of Patent: Sep. 30, 2014

(54) APPARATUS AND METHOD FOR SUPER HIGH-SPEED WIRELESS COMMUNICATIONS

(75) Inventors: Joun Sup Park, Gyunggi-do (KR); Myeong Woo Han, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 343 days.

(21) Appl. No.: 13/331,631

(22) Filed: Dec. 20, 2011

(65) Prior Publication Data
US 2013/0084904 A1  Apr. 4, 2013

(30) Foreign Application Priority Data
Sep. 29, 2011  (KR) .................. 10-2011-0099233

(51) Int. Cl.
*H04B 7/00* (2006.01)
*H04M 1/00* (2006.01)
*H04W 28/22* (2009.01)

(52) U.S. Cl.
CPC ................... *H04W 28/22* (2013.01)
USPC .............. 455/552.1; 455/553.1; 455/550.1; 455/500

(58) Field of Classification Search
CPC ................... H04W 88/10
USPC ............ 455/552.1, 556.1, 557, 500, 553.1
See application file for complete search history.

(56) References Cited

U.S. PATENT DOCUMENTS

| | | | |
|---|---|---|---|
| 7,584,326 B2 * | 9/2009 | Ahmed ........................ | 711/128 |
| 2003/0078037 A1 * | 4/2003 | Auckland et al. ............ | 455/422 |
| 2008/0205509 A1 | 8/2008 | Le Naour et al. | |
| 2010/0248817 A1 * | 9/2010 | Anderson ..................... | 463/25 |
| 2011/0110332 A1 * | 5/2011 | Kim et al. .................... | 370/331 |

FOREIGN PATENT DOCUMENTS

| | | |
|---|---|---|
| JP | 2006-050207 | 2/2006 |
| KR | 2008-0069536 A | 7/2008 |
| KR | 10-2011-0030164 A | 3/2011 |
| KR | 2011-007182 A | 6/2011 |
| WO | WO-2008091107 A1 | 7/2008 |

OTHER PUBLICATIONS

Korean Office Action issued in Korean Patent Application No. 10-2011-0099233, mailed Nov. 22, 2012, with English translation.

* cited by examiner

*Primary Examiner* — Tilahun B Gesesse
(74) *Attorney, Agent, or Firm* — McDermott Will & Emery LLP

(57) ABSTRACT

There are provided an apparatus and a method for super high-speed wireless communications. The apparatus includes a signal processor transmitting data to be transmitted through a predetermined super high-speed communications network when the super high-speed communications network is connected and transmitting data to be transmitted through a predetermined high-speed communications network when the super high-speed communications network is disconnected; a super high-speed wireless communications unit converting the data transmitted from the signal processor to a super high-speed wireless signal suitable for transmission through the super high-speed communications network; and a high-speed wireless communications unit converting the data transmitted from the signal processor to a high-speed wireless signal suitable for transmission through the high-speed communications network.

11 Claims, 3 Drawing Sheets

APPARATUS AND METHOD FOR SUPER HIGH-SPEED WIRELESS COMMUNICATIONS

CROSS-REFERENCE TO RELATED APPLICATIONS

This application claims the priority of Korean Patent Application No. 10-2011-0099233 filed on Sep. 29, 2011, in the Korean Intellectual Property Office, the disclosure of which is incorporated herein by reference.

BACKGROUND OF THE INVENTION

1. Field of the Invention

The present invention relates to an apparatus and a method for super high-speed wireless communications that can efficiently use a super high-speed communications network and a high-speed communications network according to a communications environment.

2. Description of the Related Art

In general, with the development of mobile apparatuses, a trend in mobile apparatus data transmission rate increases has been apparent. Technologies such as long term evolution (LTE) and worldwide interoperability for microwave access (WiMax), as 4G mobile communications technologies have started to be applied to mobile apparatuses for high-speed data communications, and the existing Wi-Fi networks have also adopted the IEEE 802.11n standard to which multiple input-multiple output (MIMO) technology has been applied in order to achieve higher data transmission rates.

However, data transmission rates may be insufficient to completely implement functions such as N-screen or Cloud computing. The reason therefor is that it is difficult to achieve high data transmission rates, as competition for the use of frequencies has increased with the rapid proliferation of the number of the mobile apparatuses in use, in addition to a narrow bandwidth allocated thereto. Moreover, there is a difficulty in significantly reducing power consumption in mobile apparatuses using batteries as their main power supply.

Meanwhile, as a technology capable of significantly increasing the data transmission rates, with respect to power consumption, a millimeter-wave (mmWave) high-speed communications technology has emerged. Since the mmWave high-speed communications technology can use up to 4 channels having a bandwidth of 1.7 GHz in the WiGig standard, using 60 GHz as a central frequency, the mmWave high-speed communications scheme can transmit data at rates of up to 10 times higher than those of existing wireless technology transmission rates using 2.4 GHz or 5 GHz, used in existing WiFi networks.

However, since it may be difficult to perform long range communications due to frequency characteristics of the mmWave high-speed communications technology, such as large losses in a high-speed communications network using 60 GHz as a central frequency, an auxiliary communications network should be additionally used, according to an environment in the case of the high-speed communications network using 60 GHz, and as a result, research and development into the implementation thereof are required.

SUMMARY OF THE INVENTION

An aspect of the present invention provides an apparatus and a method for super high-speed wireless communications that achieve high data rate transmissions while significantly reducing power consumption by efficiently using a super high-speed communications network and a high-speed communications network according to a communications environment.

According to an aspect of the present invention, there is provided an apparatus for super high-speed wireless communications, the apparatus including: a signal processor transmitting data to be transmitted through a predetermined super high-speed communications network when the super high-speed communications network is connected and transmitting data to be transmitted through a predetermined high-speed communications network when the super high-speed communications network is disconnected; a super high-speed wireless communications unit converting the data transmitted from the signal processor to a super high-speed wireless signal suitable for transmission through the super high-speed communications network; and a high-speed wireless communications unit converting the data transmitted from the signal processor to a high-speed wireless signal suitable for transmission through the high-speed communications network.

The signal processor may include a signal processing unit transmitting the data to be transmitted through the super high-speed communications network when the super high-speed communications network is connected and transmitting the data to be transmitted through the high-speed communications network when the super high-speed communications network is disconnected; and a compression unit compressing the data received from the signal processing unit when the data to be transmitted is required to be compressed and providing the compressed data to the high-speed wireless communications unit, wherein the signal processing unit may determine whether the data to be transmitted is required to be compressed and provide the data to be compressed to the compression unit when the data to be transmitted is required to be compressed.

The super high-speed communications network may use 60 GHz as a central frequency.

The high-speed communications network may use one wireless LAN standard among IEEE 802.11a, 11b, 11g, and 11n.

The compression unit may use the H.264 standard for video service.

According to another aspect of the present invention, there is provided an apparatus for super high-speed wireless communications, the apparatus including: a signal processor transmitting data to be transmitted through a super high-speed communications network using 60 GHz as a central frequency when the super high-speed communications network is connected, and transmitting data to be transmitted through a high-speed communications network according to one wireless LAN standard among IEEE 802.11a, 11b, 11g, and 11n when the super high-speed communications network is disconnected; a super high-speed wireless communications unit converting the data transmitted from the signal processor to a super high-speed wireless signal suitable for transmission through the super high-speed communications network; and a high-speed wireless communications unit converting the data to be transmitted from the signal processor to a high-speed wireless signal suitable for transmission through the high-speed communications network. The signal processor includes a signal processing unit transmitting the data to be transmitted through the super high-speed communications network when the super high-speed communications network is connected and transmitting the data to be transmitted through the high-speed communications network when the super high-speed communications network is disconnected; and a compression unit compressing the data received from the signal processing unit when the data to be transmitted is required to be compressed and providing the compressed data to the high-speed wireless communications unit, wherein the signal processing unit determines whether the data to be transmitted is required to be compressed and provides the data to be compressed to the compression unit when the data to be transmitted is required to be compressed.

The compression unit may use the H.264 standard for video service.

According to another aspect of the present invention, there is provided a method for super high-speed wireless communications, the method including: determining whether a predetermined super high-speed communications network is connected when data to be transmitted is present; transmitting the data to be transmitted through the predetermined super high-speed communications network when the super high-speed communications network is connected; determining whether the data to be transmitted is required to be compressed when the super high-speed communications network is disconnected; compressing the data to be transmitted according to a predetermined compression standard when the data to be transmitted is required to be compressed; and transmitting the compressed data or uncompressed data through a predetermined high-speed communications network when the super high-speed communications network is disconnected.

The super high-speed communications network may use 60 GHz as a central frequency.

The high-speed communications network may use one wireless LAN standard among IEEE 802.11a, 11b, 11g, and 11n.

The compression standard may be the H.264 standard for video service.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
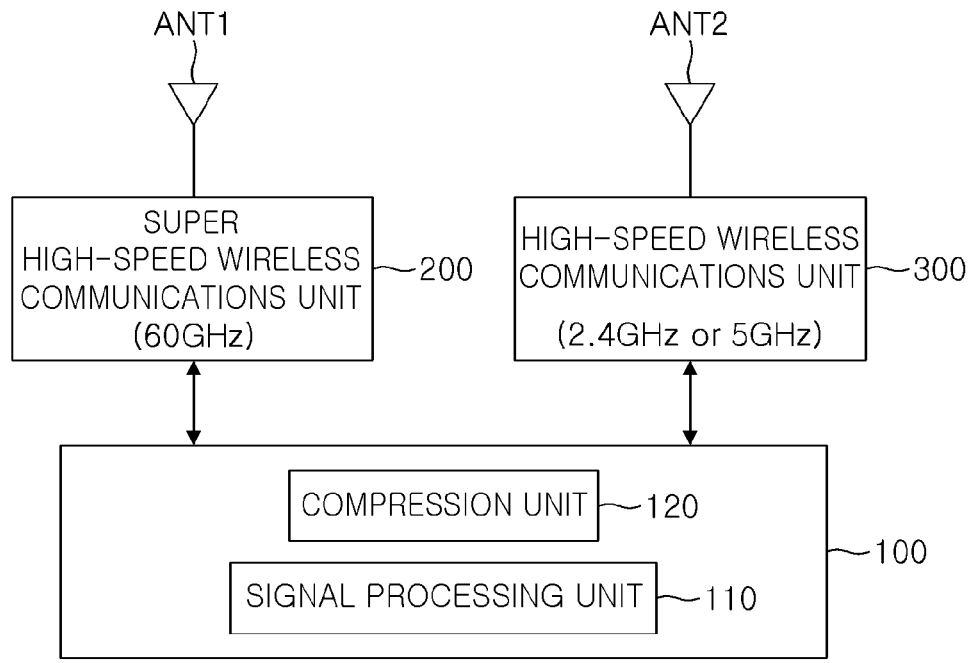
FIG. 1 is a block diagram of an apparatus for super high-speed wireless communications according to an embodiment of the present invention.

Embodiments of the present invention will now be described in detail with reference to the accompanying drawings.

The present invention should not be construed as being limited to the embodiments set forth herein and the embodiments may be used to assist in understanding the technical idea of the present invention. Like reference numerals designate like components having substantially the same constitution and function in the drawings of the present invention.

First, an apparatus for super high-speed wireless communications will be described with reference to FIGS. 1 through 4.

FIG. 1 is a block diagram of an apparatus for super high-speed wireless communications according to an embodiment of the present invention.

Referring to FIG. 1, an apparatus for super high-speed wireless communications may include a signal processor 100 transmitting data to be transmitted through a predetermined super high-speed communications network when the super high-speed communications network is connected, and transmitting data to be transmitted through a predetermined high-speed communications network when the super high-speed communications network is disconnected, a super high-speed wireless communications unit 200 converting the data transmitted from the signal processor 100 to a super high-speed wireless signal suitable for transmission through the super high-speed communications network, and a high-speed wireless communications unit 300 converting the data transmitted from the signal processor 100 to a high-speed wireless signal suitable for transmission through the high-speed communications network.

In FIG. 1, the signal processor 100 may transmit data to be transmitted through the super high-speed communications network when the super high-speed communications network is connected, and transmit data to be transmitted through the high-speed communications network when the super high-speed communications network is disconnected.

In this case, whether the super high-speed communications network is linked or not may be determined based on a super high-speed communications network enable signal Sen inputted from the outside.

In particular, the enable signal Sen may be used to determine a super high-speed wireless communications link state in a system adopting the super high-speed wireless communications apparatus of the embodiment of the present invention. For example, the enable signal Sen may include 'good link establishment information' when a communications state is good as the super high-speed communications network is linked, and include 'poor link establishment information' when the super high-speed communications network is not linked or the link state is poor even if the super high-speed communications network is linked.

Further, the super high-speed wireless communications unit 200 may convert the data transmitted from the signal processor 100 to a super high-speed wireless signal to transmit the corresponding signal through a first antenna ANT1 when a 60 GHz super high-speed communications network is connected.

Here, the super high-speed communications network may be a communications network using 60 GHz as a central frequency according to the IEEE 802.15.3c, wireless HD, or IEEE 802.11ad (WiGig) standard, and is not limited thereto but may be a system using 60 GHz as a central frequency, wireless LAN (WLAN), or wireless PAN (WPAN).

In addition, the high-speed wireless communications unit 300 may convert the data transmitted from the signal processor 100 to a high-speed wireless signal to transmit the corresponding signal through a second antenna ANT2 when the 60 GHz super high-speed communications network is disconnected or the communications state is poor.

Here, the high-speed communications network may be a communications network according to one wireless LAN (WLAN) standard among IEEE 802.11a, 11b, 11g, and 11n.

The signal processor 100 will be described below in detail. The signal processor 100 may include a signal processing unit 110 transmitting data to be transmitted through the super high-speed communications network when the super high-speed communications network is connected and transmitting data to be transmitted through the high-speed communications network when the super high-speed communications network is disconnected. The signal processing unit 110 may determine whether the data to be transmitted is required to be compressed. When the data to be transmitted is required to be compressed, the signal processing unit 110 provides the data to be transmitted to a compression unit 120 to thereby allow the compressed data to be transmitted through the high-speed communications network.

Further, the signal processor 100 may include a compression unit 120 compressing the data received from the signal processing unit 110 and providing the compressed data to the high-speed wireless communications unit 300 when the data to be transmitted is required to be compressed.

Here, the compression unit 120 may be a compression unit according to the H.264 standard for video service. In this case, since a compression rate according to the H.264 standard is relatively higher than that according to the MPEG 4 Part 2 standard, the compression unit 120 following the H.264 standard may compress data at a relatively high compression rate, and as a result, even a relatively large amount of data may be transmitted at high-speed.

First, the signal processing unit 110 may transmit the data to be transmitted through the super high-speed communications network when the predetermined super high-speed communications network is linked.

Alternatively, in the case in which the super high-speed communications network is not linked, the signal processing unit 110 determines whether the data to be transmitted is required to be compressed, and when data compression is not required, the signal processing unit 110 may transmit the data through the high-speed communications network.

In addition, in the case where the super high-speed communications network is not linked, the signal processing unit 110 provides the data to be transmitted to the compression unit 120, which compresses the data to be transmitted to transmit the compressed data through the high-speed communications network when the data to be transmitted is required to be compressed.

Here, whether the data to be transmitted is required to be compressed may be determined by comparing the amount of the data to be transmitted with an amount of reference data which is set in advance as an amount of data which is difficult to transmit in real time through high-speed communications.

That is, as described above, the signal processing unit 110 may transmit data to be transmitted through three communications paths according to a current communications environment, as will be described below with reference to FIGS. 2 through 4.

Figure 2:
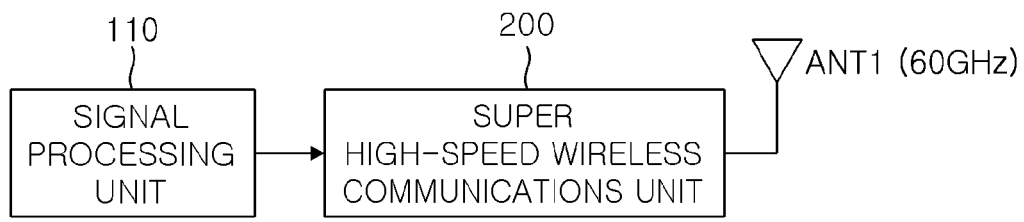
FIG. 2 is a block diagram showing super high-speed wireless communications according to the embodiment of the present invention.

FIG. 2 is a block diagram showing super high-speed wireless communications according to an embodiment of the present invention, and FIG. 2 shows a signal transmission path on which data to be transmitted is transmitted through a super high-speed communications network when the super high-speed communications network is linked.

Referring to FIG. 2, when the super high-speed communications network is connected, the data of the signal processing unit 110 is converted to a super high-speed wireless signal in the super high-speed wireless communications unit 200 to thereby be transmitted through the first antenna ANT1.

Figure 3:
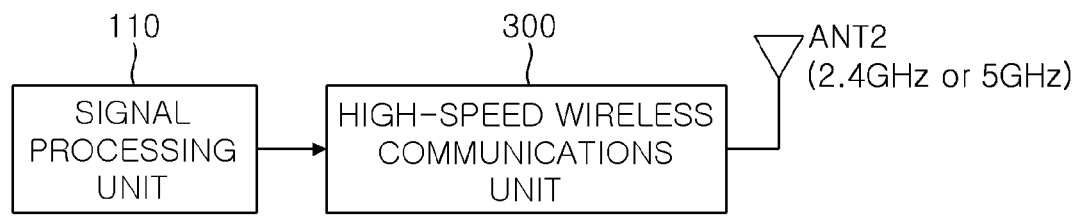
FIG. 3 is a block diagram showing uncompressed high-speed wireless communications according to the embodiment of the present invention.

FIG. 3 is a block diagram showing uncompressed high-speed wireless communications according to an embodiment of the present invention, and FIG. 3 shows a signal transmission path on which data to be transmitted is transmitted through a high-speed communications network when the super high-speed communications network is not linked and the data to be transmitted is not required to be compressed.

Referring to FIG. 3, when the super high-speed communications network is disconnected and the data to be transmitted is not required to be compressed, the data of the signal processing unit 110 is converted to a high-speed wireless signal in the high-speed wireless communications unit 300 to thereby be transmitted through the second antenna ANT2.

Figure 4:
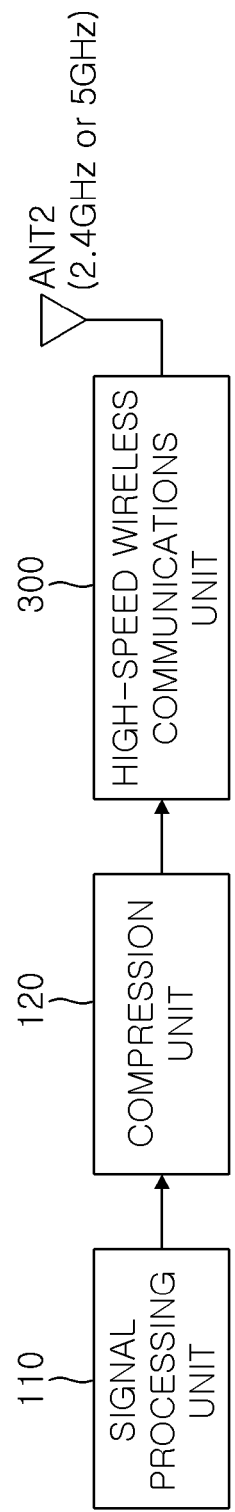
FIG. 4 is a block diagram showing compressed high-speed wireless communications according to the embodiment of the present invention.

FIG. 4 is a block diagram showing compressed high-speed wireless communications according to an embodiment of the present invention, and FIG. 4 shows a signal transmission path on which data to be transmitted is transmitted through a high-speed communications network when the super high-speed communications network is not linked and the data to be transmitted is required to be compressed.

Referring to FIG. 4, when the super high-speed communications network is disconnected and the data to be transmitted is required to be compressed, the data of the signal processing unit 110 is compressed by the compression unit 120 and thereafter, the compressed data is converted to a high-speed wireless signal in the high-speed wireless communications unit 300 to thereby be transmitted through the second antenna ANT2.

Next, a method for super high-speed wireless communications will be described with reference to FIGS. 1 through 5.

A method for super high-speed wireless communications according to an embodiment of the present invention may be performed by the super high-speed wireless communications apparatus shown in FIGS. 1 through 4.

Figure 5:
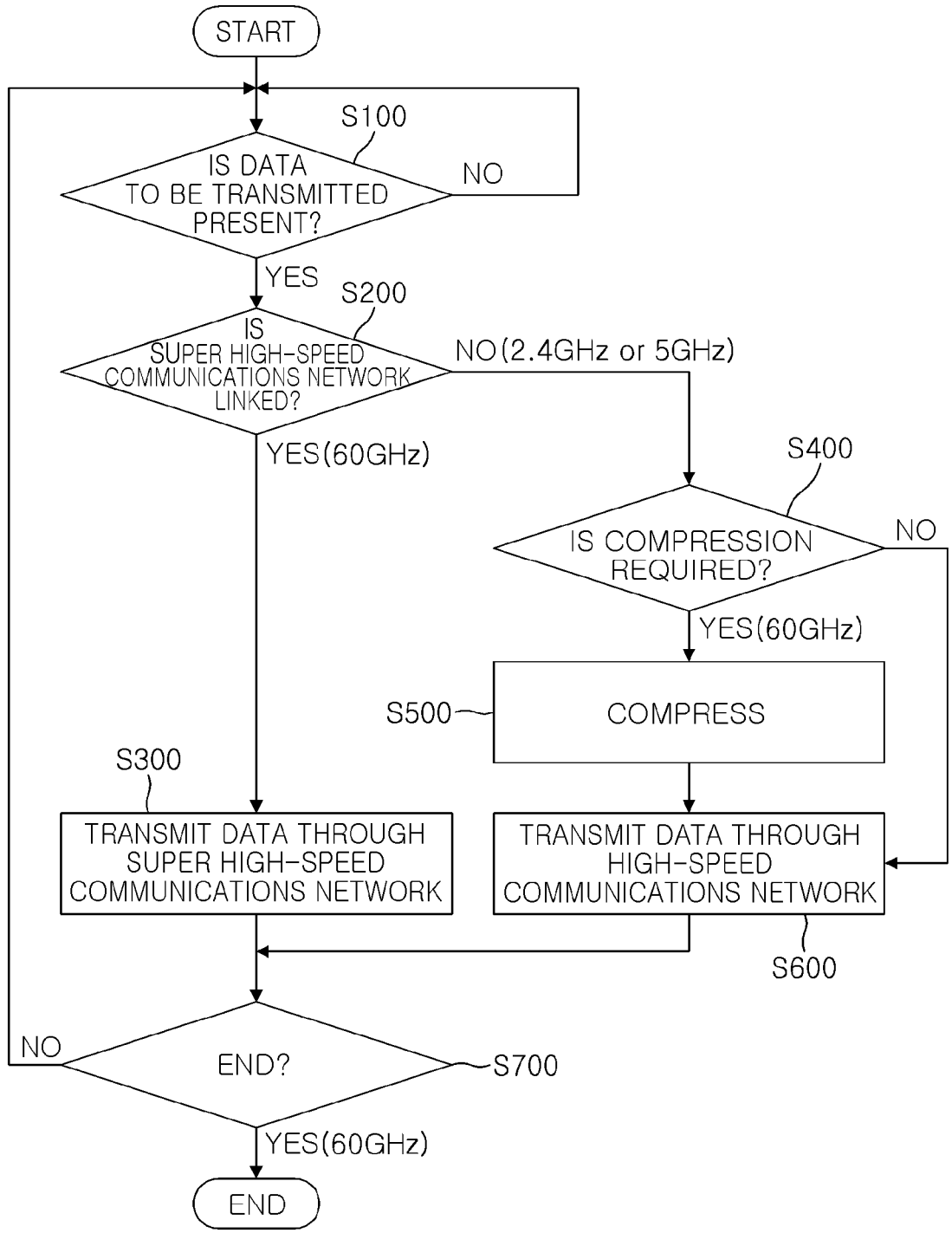
FIG. 5 is a flowchart of a method for super high-speed wireless communications according to another embodiment of the present invention.

FIG. 5 is a flowchart of a method for super high-speed wireless communications according to another embodiment of the present invention.

Referring to FIG. 5, the super high-speed wireless communications method according to the embodiment of the present invention may include: when data to be transmitted is present (S100), a link judging operation (S200) of judging whether a predetermined super high-speed communications network is linked; a super high-speed communications operation (S300) of transmitting the data to be transmitted through the predetermined super high-speed communications network when the super high-speed communications network is linked; a compression judging operation (S400) of judging whether the data to be transmitted is required to be compressed when the super high-speed communications network is disconnected; a compression operation (S500) of compressing the data to be transmitted according to a predetermined compression standard when the data to be transmitted is required to be compressed; and a high-speed communications operation (S600) of transmitting the compressed data or uncompressed data through a predetermined high-speed communications network when the super high-speed communications network is disconnected.

Here, the super high-speed communications network may be a communications network using 60 GHz as a central frequency according to the IEEE 802.15.3c, wireless HD, or IEEE 802.11ad (WiGig) standard.

Further, the high-speed communications network may be a communications network according to one wireless LAN standard among IEEE 802.11a, 11b, 11g, and 11n.

First, in the link judging operation (S200), when the data to be transmitted is present (S100), whether the predetermined super high-speed communications network is linked may be judged. This operation may be performed by the signal processor 100 shown in FIG. 1.

In this case, whether the super high-speed communications network is linked may be judged based on a super high-speed communications network enable signal Sen inputted from the outside.

In particular, the enable signal Sen may be used to determine a super high-speed wireless communications link state in a system adopting the super high-speed wireless communications apparatus of the embodiment of the present invention. For example, the enable signal Sen may include 'good link establishment information' when a communications state is good as the super high-speed communications network is linked, and include 'poor link establishment information' when the super high-speed communications network is not linked or the link state is poor even if the super high-speed communications network is linked.

Next, in the super high-speed communications operation (S300), when the super high-speed communications network is linked, the data to be transmitted may be transmitted through the predetermined super high-speed communications network.

That is, referring to FIG. 2, when the super high-speed communications network is linked, the data from the signal processing unit 110 is converted to a super high-speed wireless signal in the super high-speed wireless communications unit 200 to thereby be transmitted through the first antenna ANT1.

Next, in the compression judging operation (S400), when the super high-speed communications network is disconnected, whether the data to be transmitted is required to be compressed may be judged.

Herein, whether the data to be transmitted is required to be compressed may be judged by comparing the amount of the data to be transmitted with an amount of reference data which is set in advance as an amount of data which is difficult to transmit in real time through high-speed communications.

Thereafter, in the compression operation (S500), when data compression is required, the data to be transmitted may be compressed according to a predetermined compression standard.

In this case, the compression standard may be a compression standard according to the H.264 standard for video service. In this case, since a compression rate according to the H.264 standard is relatively higher than that according to the MPEG 4 Part 2 standard, the compression unit 120 following the H.264 standard may compress data at a relatively high compression rate, and as a result, even a relatively large amount of data may be transmitted at high-speed.

In addition, in the high-speed communications operation (S600), when the super high-speed communications network is not linked, the compressed data or uncompressed data may be transmitted through the predetermined high-speed communications network.

For example, referring to FIG. 3, when the super high-speed communications network is not linked and the data to be transmitted is not required to be compressed, the data from the signal processing unit 110 is converted to a high-speed wireless signal in the high-speed wireless communications unit 300 to thereby be transmitted through the second antenna ANT2.

As another example, referring to FIG. 4, when the super high-speed communications network is not linked and the data to be transmitted is required to be compressed, the data of the signal processing unit 110 is compressed by the compression unit 120 and thereafter, the compressed data is converted to the high-speed wireless signal in the high-speed wireless communications unit 300 to thereby be transmitted through the second antenna ANT2.

As set forth above, according to the embodiments of the present invention, the super high-speed communications network and the high-speed communications network can be efficiently used according to a communications environment to thereby significantly reduce power consumption and achieve a high data transmission rate.

That is, the high data transmission rate can be implemented at minimum level of power by using a 60 GHz band. Even when the 60 GHz band channel environment deteriorates, communications with high reliability can be implemented by switching over to WiFi of a 2.4 GHz band.

While the present invention has been shown and described in connection with the embodiments, it will be apparent to those skilled in the art that modifications and variations can be made without departing from the spirit and scope of the invention as defined by the appended claims.

What is claimed is:

1. An apparatus for super high-speed wireless communications, the apparatus comprising:
  a signal processor configured to transmit data to be transmitted through a predetermined super high-speed communications network when the super high-speed communications network is connected and transmit data to be transmitted through a predetermined high-speed communications network when the super high-speed communications network is disconnected;
  a super high-speed wireless communications unit configured to convert the data transmitted from the signal processor to a super high-speed wireless signal suitable for transmission through the super high-speed communications network; and
  a high-speed wireless communications unit configured to convert the data transmitted from the signal processor to a high-speed wireless signal suitable for transmission through the high-speed communications network a compression unit configured to compress data received from a signal processing unit when the data to be transmitted is required to be compressed and provide the compressed data to the high-speed wireless communications unit, and wherein the signal processing unit determines whether the data to be transmitted is required to be compressed and provides the data to be compressed to the compression unit when the data to be transmitted is required to be compressed.

2. The apparatus of claim 1, wherein the signal processor includes:
  a signal processing unit configured to transmit the data to be transmitted through the super high-speed communications network when the super high-speed communications network is connected and transmit the data to be transmitted through the high-speed communications network when the super high-speed communications network is disconnected.

3. The apparatus of claim 2, wherein the compression unit uses the H.264 standard for video service.

4. The apparatus of claim 1, wherein the super high-speed communications network uses 60 GHz as a central frequency.

5. The apparatus of claim 4, wherein the high-speed communications network uses one wireless LAN standard among IEEE 802.11a, 11b, 11g, and 11n.

6. An apparatus for super high-speed wireless communications, the apparatus comprising:
  a signal processor transmitting data to be transmitted through a super high-speed communications network using 60 GHz as a central frequency when the super high-speed communications network is connected, and transmitting data to be transmitted through a high-speed communications network according to one wireless LAN standard among IEEE 802.11a, 11b, 11g, and 11n when the super high-speed communications network is disconnected;

a super high-speed wireless communications unit converting the data transmitted from the signal processor to a super high-speed wireless signal suitable for transmission through the super high-speed communications network; and a high-speed wireless communications unit converting the data to be transmitted from the signal processor to a high-speed wireless signal suitable for transmission through the high-speed communications network, wherein the signal processor includes:

a signal processing unit transmitting the data to be transmitted through the super high-speed communications network when the super high-speed communications network is connected and transmitting the data to be transmitted through the high-speed communications network when the super high-speed communications network is disconnected; and a compression unit compressing the data received from the signal processing unit when the data to be transmitted is required to be compressed and providing the compressed data to the high-speed wireless communications unit, wherein the signal processing unit determines whether the data to be transmitted is required to be compressed and provides the data to be compressed to the compression unit when the data to be transmitted is required to be compressed.

7. The apparatus of claim 6, wherein the compression unit uses the H.264 standard for video service.

8. A method for super high-speed wireless communications, the method comprising:

determining, in an apparatus configured for communication across a super high-speed communications network and a high-speed communications network, whether a predetermined super high-speed communications network is connected when data to be transmitted is present;

transmitting the data to be transmitted from a signal processor of the apparatus through the predetermined super high-speed communications network when the super high-speed communications network is connected;

determining whether the data to be transmitted is required to be compressed when the super high-speed communications network is disconnected;

compressing the data to be transmitted according to a predetermined compression standard when the data to be transmitted is required to be compressed; and transmitting the compressed data or uncompressed data from the signal processor of the apparatus through a predetermined high-speed communications network when the super high-speed communications network is disconnected.

9. The method of claim 8, wherein the super high-speed communications network uses 60 GHz as a central frequency.

10. The method of claim 9, wherein the high-speed communications network uses one wireless LAN standard among IEEE 802.11a, 11b, 11g, and 11n.

11. The method of claim 8, wherein the compression standard is the H.264 standard for video service.

* * * * *